United States Patent
Ye et al.

(10) Patent No.: US 10,030,143 B2
(45) Date of Patent: Jul. 24, 2018

(54) CERAMIZED SILICONE RESIN COMPOSITION AND PRE-PREG AND LAMINATE THAT USE THE COMPOSITION

(71) Applicant: SHENGYI TECHNOLOGY CO., LTD., Guangdong (CN)

(72) Inventors: Suwen Ye, Guangdong (CN); Guofang Tang, Guangdong (CN)

(73) Assignee: SHENGYI TECHNOLOGY CO., LTD. (CN)

( * ) Notice: Subject to any disclaimer, the term of this patent is extended or adjusted under 35 U.S.C. 154(b) by 0 days.

(21) Appl. No.: 15/539,436

(22) PCT Filed: Jun. 1, 2015

(86) PCT No.: PCT/CN2015/080473
§ 371 (c)(1),
(2) Date: Jun. 23, 2017

(87) PCT Pub. No.: WO2016/101534
PCT Pub. Date: Jun. 30, 2016

(65) Prior Publication Data
US 2017/0355851 A1    Dec. 14, 2017

(30) Foreign Application Priority Data
Dec. 25, 2014    (CN) .......................... 2014 1 0828666

(51) Int. Cl.
| | |
|---|---|
| C08K 3/34 | (2006.01) |
| B32B 3/26 | (2006.01) |
| B27N 3/10 | (2006.01) |
| C08L 83/04 | (2006.01) |
| C08K 13/02 | (2006.01) |
| B32B 15/08 | (2006.01) |

(52) U.S. Cl.
CPC .............. *C08L 83/04* (2013.01); *B32B 15/08* (2013.01); *C08K 3/346* (2013.01); *C08K 13/02* (2013.01)

(58) Field of Classification Search
CPC ......... C08L 83/04; B32B 15/08; C08K 13/02; C08K 3/346
USPC ................... 524/447; 264/134, 257
See application file for complete search history.

(56) References Cited

U.S. PATENT DOCUMENTS

| | | | |
|---|---|---|---|
| 3,792,012 A | 2/1974 | Zdaniewski | |
| 2009/0182088 A9* | 7/2009 | Irwin | B82Y 30/00 524/495 |

FOREIGN PATENT DOCUMENTS

| | | |
|---|---|---|
| CN | 1339048 A | 3/2002 |
| CN | 101404189 A | 4/2009 |
| CN | 101903429 A | 12/2010 |
| CN | 102585696 A | 7/2012 |
| CN | 102925055 A | 2/2013 |
| JP | S544080 B | 3/1979 |
| JP | S62201242 A | 9/1987 |
| JP | 2000308848 A | 11/2000 |
| TW | 200416273 A | 9/2004 |

OTHER PUBLICATIONS

Patent Cooperation Treaty (PCT), International Search Report and Written Opinion for Application PCT/CN2015/080473 filed Jun. 1, 2015 dated Oct. 10, 2015, International Searching Authority, CN.

* cited by examiner

*Primary Examiner* — William K Cheung
(74) *Attorney, Agent, or Firm* — McDonald Hopkins LLC

(57) ABSTRACT

The present invention relates to a ceramized silicone resin composition and a pre-preg and a laminate that use the composition. The ceramized silicone resin composition comprises: 50-100 parts of a condensation-type silicone resin, 0.0001-2 parts of a catalyst, 5-80 parts of a ceramic-forming filler, and 0.01-50 parts of a flux. The pre-preg and the laminate manufactured using the ceramized silicone resin composition, when used in a sustained high temperature, can transform into complex ceramized structure thereby providing ceramic properties, thus providing great fireproof and flame retardant effects; also, manufacturing of the laminate is similar to that of a regular FR-4 laminate, where the process is easy to operate. The ceramized silicone resin composition, the pre-preg, and the laminate have the advantages of being halogen-free, low smoke, low toxicity, flame retardant, and fireproof, provide a novel concept and a novel method in terms of flame retardancy and fire resistance, accelerate the research progress in laminate passive fire protection technology, and have broad prospects in the field of fire protection and fire resistance.

14 Claims, No Drawings

CERAMIZED SILICONE RESIN COMPOSITION AND PRE-PREG AND LAMINATE THAT USE THE COMPOSITION

CROSS-REFERENCE TO RELATED APPLICATION

This application is a 35 U.S.C. 371 national stage filing of PCT Application No. PCT/CN2015/080473, filed on Jun. 1, 2015, which claims priority to Chinese Patent Application No. 201410828666.6, filed on Dec. 25, 2014 each of which are incorporated herein in their entirety by reference.

TECHNICAL FIELD

The present invention relates to a ceramic silicone resin composition and a prepreg, a laminate and a printed circuit board using the same, which have the advantages of halogen-free, low smoke, low toxicity, self-extinguishing and environmental protection, etc. and have broad prospects in the fields of high heat resistance, fire resistance and aerospace technology, etc. The present invention provides new ideas and new methods for the application of laminates and copper-clad laminates in the fields of flame retardancy and fire resistance.

BACKGROUND ART

At present, in order to impart flame retardancy to laminates, the formulation in combination with the brominated flame retardants is used. However, in recent years, more and more attentions have been paid to the environmental problems, and it is desirable to use the resin compositions containing no halogen compound to further study the phosphorus compounds which can replace the halogen-containing flame retardants. However the phosphorus compounds may also produce toxic compounds such as phosphine, etc. when burned, therefore it is extremely urgent to develop laminates containing no halogen and phosphorus compounds and having excellent flame retardancy.

Although ordinary FR-4 laminates and copper-clad laminates have flame retardancy and self-extinguishing when burned in the fire, the burning residues have no mechanical strength and become ashes after continuous high temperature combustion, the integrity of the articles cannot be maintained as well, even more dangerous secondary disaster may be caused, which will result in short circuit, thus they cannot be used in the fields of high fire resistance and high heat resistance.

The ceramic silicone resin laminate exhibits excellent properties of ordinary silicone resin at room temperature. However, it can be converted into a complex ceramic structure at high temperature to have ceramic properties, and becomes a hard self-supporting ceramic product with a certain strength, which can withstand a certain impact force, and can also maintain the integrity of the laminates when ablated in open flames at 1000° C. or more, so as to isolate the reaction of the internal materials under the surrounding high temperature, which can play a better fire resistance and flame retardancy role and guarantee the smooth of electricity and communication during the fire.

Silica in a powdered form will be generated when the silicone resin burns at high temperature. However, after a silicate-based fire-resistant filler (mica, wollastonite, and kaolin, etc.) is added, the silica generated by the decomposition of the silicone resin may react with the fire-resistant filler and form an "eutectic mixture" at the edge of the filler to play a bridging role between the silica particles and filler particles, which is solidified at the ignition temperature, and an agglomerated ceramic product can be formed when cooling. This ceramic body has self-supporting property, and is able to withstand a certain mechanical shock and vibration, which can be used as thermal protection materials, heat-resistant wave-transmitting and absorbing integrated materials or other functional laminates with high temperature requirements.

The ceramic silicone resin laminate has the advantages of excellent electrical properties, good thermal shock resistance, halogen-free, low smoke, low toxicity, self-extinguishing and environmental protection, etc. The present invention provides new ideas and new methods in terms of flame retardancy and fire resistance to accelerate the development of research on the passive fire resistance technology of laminates, which have broad prospects in the fields of flame retardancy and fire resistance.

DISCLOSURE OF THE INVENTION

In view of the above, the object of the present invention is to provide a halogen- and phosphorus-free, flame retardant self-extinguishing and high heat resistant ceramic silicone resin composition, a prepreg and a laminate. The laminate can form a hard self-supporting ceramic product after continuous combustion, which has a certain strength and can withstand a certain impact force as well as guarantee the smooth of electricity and communication during the fire.

In order to achieve the above object, the present invention employs the following technical solution.

A ceramic silicone resin composition, wherein the ceramic silicone resin composition comprises in parts by weight:
50-100 parts of a condensation type silicone resin;
0.0001-2 parts of a catalyst;
5-80 parts of a ceramic-forming filler; and
0.01-50 parts of a fluxing agent.

The content of the condensation type silicone resin is, for example, 53 parts, 57 parts, 61 parts, 65 parts, 69 parts, 73 parts, 77 parts, 81 parts, 85 parts, 89 parts, 93 parts, 97 parts or 99 parts.

The content of the catalyst is, for example, 0.0001 part, 0.0005 part, 0.001 part, 0.005 part, 0.01 part, 0.05 part, 0.1 part, 0.5 part, 0.9 part, 1.3 parts, 1.7 parts and 2.0 parts.

The content of the ceramic-forming filler is, for example, 10 parts, 15 parts, 20 parts, 25 parts, 30 parts, 35 parts, 40 parts, 45 parts, 50 parts, 55 parts, 60 parts, 65 parts, 70 parts, 75 parts or 80 parts.

The content of the fluxing agent is 0.01-50 parts by weight, for example, 0.03 part by weight, 0.1 part by weight, 0.5 part by weight, 1 part by weight, 5 parts by weight, 9 parts by weight, 13 parts by weight, 17 parts by weight, 21 parts by weight, 25 parts by weight, 29 parts by weight, 33 parts by weight, 37 parts by weight, 41 parts by weight, 45 parts by weight or 49 parts by weight.

In the present invention, the fluxing agent (also known as flux) refers to a substance that can reduce the softening, melting or liquefying temperature of other substances. The melting point of the ceramic-forming filler used in the ceramic silicone resin is very high, and the ceramic temperature after combustion is correspondingly very high as well. In order to achieve "low temperature firing", i.e., the ceramization can be started at a lower temperature to obtain a ceramic body with a certain strength to better play the fire resistance role of the ceramic silicone resin, a fluxing agent is added in the formulation.

In the present invention, the fluxing agent is any one selected from the group consisting of a glass additive, a boron-containing compound and zinc oxide, or a mixture of at least two selected therefrom, preferably any one selected from the group consisting of glass powder, zinc oxide, iron oxide and zinc borate, or a mixture of at least two selected therefrom.

In the present invention, the glass additive is one or more suitable raw materials including glass powder, etc., which is added to the resin composition in order to improve the various properties of the ceramic resin composition during the ceramic-forming process to make it easier to melt, shape and minimize the defects as much as possible.

In the present invention, the ceramic-forming filler is a layered silicate-based mineral filler, presents a crystal structure, has a high melting point (high refractoriness) and high sintering degree, and has excellent electrical insulation properties. The ceramic-forming filler is any one selected from the group consisting of mica, wollastonite and kaolin, or a combination of at least two selected therefrom.

In the present invention, the condensation type silicone resin is coordinated with the ceramic-forming filler, and the silica generated by the decomposition of the silicone resin may react with the ceramic-forming filler when burned at high temperature to form an "eutectic mixture" at the edge of the filler so as to play a bridging role between the silica particles and filler particles, which is solidified at the ignition temperature, and an agglomerated self-supporting ceramic product can be formed when cooling, which has a certain strength and can withstand a certain impact force as well as guarantee the smooth of electricity and communication during the fire.

In the present invention, the condensation type silicone resin is mainly any one selected from the group consisting of a methyl silicone resin, a methylphenyl silicone resin, and a phenyl silicone resin, or a mixture of at least two selected therefrom.

In the present invention, the condensation type silicone resin is any one selected from the group consisting of dehydration condensation, dealcoholization condensation and dehydrogenation condensation, and the reaction structures thereof are as shown below:

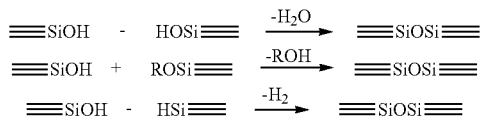

In the present invention, the condensation type silicone resin is a methyl or methylphenyl silicone resin with R/Si=1.0-1.7 (molar ratio) (for example, 1.1, 1.2, 1.3, 1.4, 1.5, 1.6 or 1.7) and Ph/(Me+Ph)=0-1.0 (molar ratio) (for example, 0.1, 0.2, 0.3, 0.4, 0.5, 0.6, 0.7, 0.8, 0.9 or 1.0), wherein Ph represents a phenyl group, Me represents a methyl group, and R represents an organic functional group selected from —$CH_3$, —Ph, —$OCH_3$, —$OCH_2CH_3$ or —OH. In the condensation type silicone resin, if the R/Si (molar ratio) is too small, and the Ph/Si (molar ratio) is too low, the silicone resin is poor in softness after curing, and the paint film becomes hard, while if the R/Si (molar ratio) is too large, and the Ph/Si (molar ratio) is too high, the laminate is low in hardness, and its curing is slow and the thermosetting property is low. Therefore, the condensation type silicone resin is preferably a methylphenyl silicone resin with R/Si=1.2-1.7 (molar ratio) and Ph/(Me+Ph)=0.2-0.6 (molar ratio).

According to the present invention, the catalyst is any one selected from the group consisting of zinc naphthenate, tin naphthenate, cobalt naphthenate, iron naphthenate, cerium naphthenate, zinc carboxylate, tin carboxylate, cobalt carboxylate, iron carboxylate, cerium carboxylate, perfluorosulfonic acid, phosphonitrilic chloride, amines, quaternary ammonium bases, zinc caprylate, zinc isooctanoate, titanates and guanidine compounds, or a combination of at least two selected therefrom.

In the present invention, the ceramic silicone resin composition further comprises a non-ceramic-forming filler or/and an additive.

In the present invention, the additive comprises any one selected from the group consisting of a silane coupling agent, a titanate coupling agent, and a dispersant, or a combination of at least two selected therefrom.

The content of the additive is 0.01-10 parts by weight, for example, 0.05 part, 0.1 part, 0.5 part, 1 part, 1.5 parts, 2 parts, 2.5 parts, 3 parts, 3.5 parts, 4 parts, 4.5 parts, 5 parts, 5.5 parts, 6 parts, 6.5 parts, 7 parts, 7.5 parts, 8 parts, 8.5 parts, 9 parts or 9.5 parts.

In the present invention, the non-ceramic-forming filler generally refers to a filler other than the ceramic-forming filler of the present invention.

In the present invention, the non-ceramic-forming filler comprises any one selected from the group consisting of silica, alumina, aluminum hydroxide, boron nitride, aluminum nitride, silicon nitride and silicon carbide, or a mixture of at least two selected therefrom.

In the present invention, the content of the non-ceramic-forming filler is 5-80 parts by weight, for example, 10 parts by weight, 15 parts by weight, 20 parts by weight, 25 parts by weight, 30 parts by weight, 35 parts by weight, 40 parts by weight, 45 parts by weight, 50 parts by weight, 55 parts by weight, 60 parts by weight, 65 parts by weight, 70 parts by weight or 75 parts by weight.

An exemplary ceramic silicone resin composition, wherein the ceramic silicone resin composition comprises in parts by weight:
50-100 parts of a condensation type silicone resin;
0.0001-2 parts of a catalyst;
5-80 parts of a ceramic-forming filler;
0.01-50 parts of a fluxing agent;
5-80 parts of a non-ceramic-forming filler; and
0.01-10 parts of an additive.

According to the present invention, the average particle sizes of the ceramic-forming filler, the fluxing agent and the non-ceramic-forming filler are not particularly limited, but are independently preferably 10 μm or less, and preferably 5 μm or less, and each filler may be used singly or in combination of two or more, also can be used suitably in combination with, for example, a composition having a different particle size distribution and a different average particle size.

The term "comprising/comprise(s)" as used in the present invention means that in addition to the described components, other components may be included, which impart different characteristics to the ceramic silicone resin composition. Besides, the term "comprising/comprise(s)" as used in the present invention can also be replaced by "is/are" or "consisting/consist(s) . . . of" in a closed manner.

For example, the ceramic silicone resin composition may contain various additives. As specific examples, flame retardants, antioxidants, heat stabilizers, antistatic agents, ultraviolet absorbers, pigments, colorants or lubricants, etc. can be listed. These various additives may be used singly or in a combination of two or more.

The second object of the present invention is to provide a resin glue solution which is obtained by dissolving or dispersing the ceramic silicone resin composition as described above in a solvent.

The solvent used in the present invention is not particularly limited. As specific examples, alcohols such as methanol, ethanol and butanol, etc., ethers such as ethyl cellosolve, butyl cellosolve, ethylene glycol-methyl ether, carbitol and butyl carbitol, etc., ketones such as acetone, butanone, methyl ethyl ketone, methyl isobutyl ketone, and cyclohexanone, etc., aromatic hydrocarbons such as toluene, xylene and mesitylene, etc., esters such as ethoxyethyl acetate and ethyl acetate, etc., and nitrogen-containing solvents such as N,N-dimethylformamide, N, N-dimethylacetamide, and N-methyl-2-pyrrolidone, etc. can be listed. The above-mentioned solvents may be used alone or in admixture of two or more, preferably used in admixture of aromatic hydrocarbon solvents such as toluene, xylene and mesitylene, etc. with ketone solvents such as acetone, butanone, methyl ethyl ketone, methyl isobutyl ketone, and cyclohexanone, etc. The used amount of the solvent can be selected by those persons skilled in the art according to their own experience so that the solid content of the obtained resin glue solution can reach 50-70%.

The third object of the present invention is to provide a prepreg, which comprises a reinforcing material and the ceramic silicone resin composition as described above attached to the reinforcing material after impregnation and drying.

The exemplary method for preparing the prepreg is as follows:

By weight of 100 parts of the ceramic silicone resin composition as described above, a resin glue solution having a solid content of 50-70% by weight is prepared by adding an organic solvent such as toluene or xylene, etc., the resin glue solution is impregnated with a reinforcing material such as glass fiber cloth, which is then baked at 120-190° C. for 2-15 minutes to obtain a prepreg.

The fourth object of the present invention is to provide a laminate, which comprises at least one prepreg as described above.

The fifth object of the present invention is to provide a copper-clad laminate, which comprises at least one laminated prepreg as described above and a copper foil pressed on one side or both sides of the laminated prepreg.

Compared with the prior art, the present invention has the following beneficial effects:
(1) The ceramic silicone resin laminate obtained by the present invention can form a hard structure when it is continuously burned, which has a certain strength and can withstand a certain impact force, and can also maintain the integrity of the laminate when it is ablated in continuous open flames;
(2) The ceramic silicone resin laminate obtained by the present invention has extremely excellent heat resistance, and the temperature for decomposing 1% of the ceramic silicone resin laminate is 548.7° C. or higher, therefore it can not only be applied to high temperature-resistant electrical insulation materials of high power motors, but also to high temperature-resistant structural materials of aerospace vehicles and has very broad application prospects;
(3) The ceramic silicone resin composition of the present invention has the advantages of halogen-free, low smoke, low toxicity, self-extinguishing and environmental protection, etc., which provides new ideas and new methods for the application of laminates and copper-clad laminates in the fields of flame retardancy and fire resistance;
(4) All the technologies and equipments used in the preparation process of the present invention are general types for ordinary FR-4, and the present invention can be implemented completely with the existing production equipments, which is very conducive to the industrialization of the product.

EMBODIMENTS

The technical solution of the present invention will be further described below by way of specific embodiments.

EXAMPLE 1

100.0 parts of a methyl silicone resin with R/Si=1.1 (molar ratio) and Ph/(Ph+Me)=0 (molar ratio) was weighed and dissolved in 120.0 parts of a toluene solvent, then stirred to dissolve it completely. After the silicone resin was dissolved completely, 20.0 parts of mica powder, 35.0 parts of kaolin, 35.0 parts of wollastonite, 15.0 parts of zinc oxide, 25.3 parts of glass powder, 0.0001 parts of zinc isooctanoate, 10.0 parts of aluminum oxide, and 8.9 parts of a silane coupling agent γ-(2,3-epoxypropoxy) propyltrimethoxysilane (supplied by Dow Corning Corporation, U.S.A.) were added, and stirred to be mixed well so that a glue solution was obtained. A smooth and glabrous E-glass fiber cloth with a thickness of 0.1 mm was selected, evenly coated with the glue solution obtained above, and baked in the oven at 170° C. for 5 minutes to obtain a prepreg. 8 sheets of prepregs obtained above were laminated and 35 μm of copper foils were attached to the upper and lower surfaces, then placed in a vacuum hot press at a pressure of 3 MPa and a temperature of 220° C. to be pressed for 3 hours to obtain a laminate.

The flame retardancy effect of the ceramic silicone resin glass cloth laminate was UL V-0 grade, and the temperature for 1% thermal weight loss thereof was up to 548.7° C., thus it had extremely excellent heat resistance; the double-sided copper-clad laminate was cut into a size of 200 mm×200 mm and subjected to an etching treatment to obtain an organic silicone resin laminate, the ceramic-forming effect of which was obvious after the laminate was ablated in open flames (800-1100° C.) for 0.5 hour, and the laminate was hard in texture and without obvious holes.

EXAMPLE 2

80.0 parts of a methylphenyl silicone resin with R/Si=1.4 (molar ratio) and Ph/(Ph+Me)=0.5 (molar ratio) was weighed and dissolved in 65.0 parts of a toluene solvent, then stirred to dissolve it completely. After the silicone resin was dissolved completely, 40.4 parts of kaolin, 25.7 parts of zinc borate, 23.0 parts of silica fine powder, 0.08 parts of cobalt acetylacetonate, 1.5 parts of a silane coupling agent γ-methylacryloyloxypropyltrimethoxysilane coupling agent (supplied by Hubei WuDa Silicone New Materials Co., Ltd.) were added, and stirred to be mixed well so that a glue solution was obtained.

A prepreg and a double-sided copper-clad laminate having a thickness of 1.0 mm were obtained in the same manners as those in Example 1 except that the resin glue solution prepared above was used.

The flame retardancy effect of the ceramic silicone resin glass cloth laminate was UL V-0 grade, and the temperature for 1% thermal weight loss thereof was up to 611.8° C., thus it had extremely excellent heat resistance. The double-sided copper-clad laminate was cut into a size of 200 mm×200 mm and subjected to an etching treatment to obtain an organic silicone resin laminate, the ceramic-forming effect of which was obvious after the laminate was ablated in open flames (800-1100° C.) for 0.5 hour, and the laminate was hard in texture and without obvious holes.

EXAMPLE 3

50.0 parts of a phenyl silicone resin with R/Si=1.7 (molar ratio) and Ph/(Ph+Me)=1.0 (molar ratio) was weighed and dissolved in 80.0 parts of a toluene solvent, then stirred to dissolve it completely. After the silicone resin was dissolved completely, 7.0 parts of wollastonite, 0.05 parts of glass powder, 1.5 parts of titanate, and 0.7 parts of a silane coupling agent γ-methylacryloyloxypropyltrimethoxysilane (supplied by Hubei WuDa Silicone New Materials Co., Ltd.) were added, and stirred to be mixed well so that a glue solution was obtained.

A prepreg and a double-sided copper-clad laminate having a thickness of 1.0 mm were obtained in the same manners as those in Example 1 except that the resin glue solution prepared above was used.

The flame retardancy effect of the ceramic silicone resin glass cloth laminate was UL V-0 grade, the temperature for 1% thermal weight loss thereof was up to 581.9° C., thus it had extremely excellent heat resistance. The double-sided copper-clad laminate was cut into a size of 200 mm×200 mm and subjected to an etching treatment to obtain an organic silicone resin laminate, the ceramic-forming effect of which was obvious after the laminate was ablated in open flames (800-1100° C.) for 0.5 hour, and the laminate was hard in texture and without obvious holes.

EXAMPLE 4

40.0 parts of a methyl silicone resin with R/Si=1.1 (molar ratio) and Ph/(Ph+Me)=0 (molar ratio) and 40 parts of a methylphenyl silicone resin with R/Si=1.7 (molar ratio) and Ph/(Ph+Me)=0.9 (molar ratio) were weighed and dissolved in 65.0 parts of a toluene solvent, then stirred to dissolve it completely. After the silicone resin was dissolved completely, 40.4 parts of kaolin, 25.7 parts of zinc borate, 15.0 parts of wollastonite, 23.0 parts of silica fine powder, 0.08 part of cobalt acetylacetonate, and 1.5 parts of a silane coupling agent γ-methylacryloyloxypropyltrimethoxysilane coupling agent (supplied by Hubei WuDa Silicone New Materials Co., Ltd.) were added, and stirred to be mixed well so that a glue solution was obtained.

A prepreg and a double-sided copper-clad laminate having a thickness of 1.0 mm were obtained in the same manners as those in Example 1 except that the resin glue solution prepared above was used.

The flame retardancy effect of the ceramic silicone resin glass cloth laminate was UL V-0 grade, and the temperature for 1% thermal weight loss thereof was up to 567.3° C., thus it had extremely excellent heat resistance. The double-sided copper-clad laminate was cut into a size of 200 mm×200 mm and subjected to an etching treatment to obtain an organic silicone resin laminate, the ceramic-forming effect of which was obvious after the laminate was ablated in open flames (800-1100° C.) for 0.5 hour, and the laminate was hard in texture and without obvious holes.

COMPARATIVE EXAMPLE 1

100.0 parts of a methylvinyl silicone resin (the mass fraction of vinyl being 5.0%) and 0.003 parts of hexynol were weighed and dissolved in 120.0 parts of a toluene solvent, then stirred to dissolve it completely. After the silicone resin was dissolved completely, 13.2 parts of hydrogen-containing silicone oil (the mass fraction of the hydrogen contained therein being 1.2%), 0.001 parts of platinum-methyl vinyl complex, 20.0 parts of mica powder, 35.0 parts of kaolin, 35.0 parts of wollastonite, 15.0 parts of zinc oxide, 25.3 parts of glass powder, 10.0 parts of alumina, and 8.9 parts of a silane coupling agent γ-(2,3-epoxypropoxy) propyltrimethoxysilane (supplied by Dow Corning Corporation, U.S.A.) were added, and stirred to be mixed well so that a glue solution was obtained.

A prepreg and a double-sided copper-clad laminate having a thickness of 1.0 mm were obtained in the same manners as those in Example 1 except that the resin glue solution prepared above was used.

The flame retardancy effect of the ceramic silicone resin glass cloth laminate was UL V-1 grade, the temperature for 1% thermal weight loss thereof was up to 296° C., thus the heat resistance of which was worse than the condensation type silicone resin. The double-sided copper-clad laminate was cut into a size of 200 mm×200 mm and subjected to an etching treatment to obtain an organic silicone resin laminate, the laminate presented a charring state after the laminate was ablated in open flames (800-1100° C.) for 0.5 hour, and the ceramic-forming effect of which was not obvious.

COMPARATIVE EXAMPLE 2

100.0 parts of a methyl silicone resin with R/Si=1.1 (molar ratio) and Ph/(Ph+Me)=0 (molar ratio) was weighed and dissolved in 120.0 parts of a toluene solvent, then stirred to dissolve it completely. After the silicone resin was dissolved completely, 50.0 parts of mica powder, 35.0 parts of kaolin, 35.0 parts of wollastonite, 15.0 parts of zinc oxide, 25.3 parts of glass powder, 8.0 parts of wollastonite, 0.0001 parts of zinc isooctanoate, 10.0 parts of alumina, and 8.9 parts of a silane coupling agent γ-(2,3-epoxypropoxy) propyltrimethoxysilane Z-6040 (supplied by Dow Corning Corporation, U.S.A.) were added, and stirred to be mixed well so that a glue solution was obtained.

A prepreg and a double-sided copper-clad laminate having a thickness of 1.0 mm were obtained in the same manners as those in Example 1 except that the resin glue solution prepared above was used.

The flame retardancy effect of the ceramic silicone resin glass cloth laminate was UL V-0 grade, the temperature for 1% thermal weight loss thereof was 581.4° C., thus it had excellent heat resistance. The double-sided copper-clad laminate was cut into a size of 200 mm×200 mm and subjected to an etching treatment to obtain an organic silicone resin laminate, the laminate presented a powdery state after the laminate was ablated in open flames (800-1100° C.) for 0.5 hour, it cannot form ceramics.

COMPARATIVE EXAMPLE 3

50.0 parts of a phenyl silicone resin with R/Si=1.7 (molar ratio) and Ph/(Ph+Me)=1.0 (molar ratio) was weighed and dissolved in 80.0 parts of a toluene solvent, then stirred to dissolve it completely. After the silicone resin was dissolved completely, 7.0 parts of wollastonite, 0.005 parts of glass powder, 1.5 parts of titanate, and 0.7 parts of a silane coupling agent γ-methylacryloyloxypropyltrimethoxysilane (supplied by Hubei WuDa Silicone New Materials Co., Ltd.) were added, and stirred to be mixed well so that a glue solution was obtained.

A prepreg and a double-sided copper-clad laminate having a thickness of 1.0 mm were obtained in the same manners as those in Example 1 except that the resin glue solution prepared above was used. The flame retardancy effect of the ceramic silicone resin glass cloth laminate was UL V-0 grade, the temperature for 1% thermal weight loss thereof was 564.7° C., thus it had higher heat resistance. The double-sided copper-clad laminate was cut into a size of 200 mm×200 mm and subjected to an etching treatment to obtain an organic silicone resin laminate, the laminate can form ceramics after it was ablated in open flames (800-1100° C.) for 0.5 hour, but the laminate presented a large amount of big holes after ablating and the ceramic-forming effect was poor.

COMPARATIVE EXAMPLE 4

50.0 parts of a phenyl silicone resin with R/Si=1.7 (molar ratio) and Ph/(Ph+Me)=1.0 (molar ratio) was weighed and dissolved in 80.0 parts of a toluene solvent, then stirred to dissolve it completely. After the silicone resin was dissolved completely, 1.5 parts of titanate, and 0.7 parts of a silane coupling agent γ-methylacryloyloxypropyltrimethoxysilane (supplied by Hubei WuDa Silicone New Materials Co., Ltd.) were added, and stirred to be mixed well so that a glue solution was obtained.

A prepreg and a double-sided copper-clad laminate having a thickness of 1.0 mm were obtained in the same manners as those in Example 1 except that the resin glue solution prepared above was used. The flame retardancy effect of the ceramic silicone resin glass cloth laminate was UL V-0 grade, the temperature for 1% thermal weight loss thereof was 547.4° C., thus it had excellent heat resistance. The double-sided copper-clad laminate was cut into a size of 200 mm×200 mm and subjected to an etching treatment to obtain an organic silicone resin laminate, the laminate presented a powdery state after the laminate was ablated in open flames (800-1100° C.) for 0.5 hour, so it cannot form ceramics.

Applicant stated that although the detailed methods of the present invention have been described by the above examples in the present invention, the present invention is not limited to the detailed methods described above, that is to say, it does not mean that the present invention has to be implemented depending on the above detailed methods. It will be apparent to those skilled in the art that any improvements made to the present invention, equivalent replacements to the raw materials of the products of the present invention and additions of additive ingredients, and selections of the specific implementations, etc., all fall within the protection scope and the disclosure scope of the present invention.

The invention claimed is:

1. A ceramic silicone resin composition, wherein the ceramic silicone resin composition comprises in parts by weight:
    50-100 parts of a condensation type silicone resin;
    0.0001-2 parts of a catalyst;
    5-80 parts of a ceramic-forming filler; and
    0.01-50 parts of a fluxing agent.

2. The ceramic silicone resin composition according to claim 1, wherein the condensation type silicone resin is any one selected from the group consisting of a methyl silicone resin, a methylphenyl silicone resin, and a phenyl silicone resin, or a mixture of at least two selected therefrom.

3. The ceramic silicone resin composition according to claim 1, wherein the condensation type silicone resin is a methyl silicone resin, a methylphenyl silicone resin or a phenyl silicone resin with R/Si=1.0-1.7 (molar ratio) and Ph/(Me+Ph)=0-1.0 (molar ratio), wherein Ph represents a phenyl group, Me represents a methyl group, and R represents an organic functional group selected from —CH$_3$, -Ph, —OCH$_3$, —OCH$_2$CH$_3$, —H or —OH.

4. The ceramic silicone resin composition according to claim 1, wherein the condensation type silicone resin is a methylphenyl silicone resin with R/Si=1.2-1.7 (molar ratio) and Ph/(Me+Ph)=0.2-0.6 (molar ratio).

5. The ceramic silicone resin composition according to claim 1, wherein the catalyst is any one selected from the group consisting of zinc naphthenate, tin naphthenate, cobalt naphthenate, iron naphthenate, cerium naphthenate, zinc carboxylate, tin carboxylate, cobalt carboxylate, iron carboxylate, cerium carboxylate, perfluorosulfonic acid, phosphonitrilic chloride, amines, quaternary ammonium bases, zinc caprylate, zinc isooctanoate, titanates and guanidine compounds, or a combination of at least two selected therefrom.

6. The ceramic silicone resin composition according to claim 1, wherein the ceramic-forming filler is any one selected from the group consisting of mica powder, wollastonite and kaolin, or a combination of at least two selected therefrom;
    the fluxing agent is any one selected from the group consisting of a glass additive, a boron-containing compound and zinc oxide, or a mixture of at least two selected therefrom.

7. The ceramic silicone resin composition according to claim 1, wherein the ceramic silicone resin composition further comprises a non-ceramic-forming filler or/and an additive.

8. The ceramic silicone resin composition according to claim 7, wherein the non-ceramic-forming filler comprises any one selected from the group consisting of silica, alumina, aluminum hydroxide, boron nitride, aluminum nitride, silicon nitride and silicon carbide, or a mixture of at least two selected therefrom, and the content of the non-ceramic-forming filler is 5-80 parts by weight.

9. The ceramic silicone resin composition according to claim 7, wherein the additive comprises one selected from the group consisting of a silane coupling agent, a titanate coupling agent, and a dispersant, or a combination of at least two selected therefrom, and the content of the additive is 0.01-10 parts by weight.

10. The ceramic silicone resin composition according to claim 1, wherein the ceramic silicone resin composition comprises in parts by weight:
    50-100 parts of a condensation type silicone resin;
    0.0001-2 parts of a catalyst;
    5-80 parts of a ceramic-forming filler;
    0.01-50 parts of a fluxing agent;
    5-80 parts of a non-ceramic-forming filler; and
    0.01-10 parts of an additive;
    the average particle sizes of the ceramic-forming filler, the fluxing agent and the non-ceramic-forming filler are all independently selected from 10 μm or less.

11. A prepreg comprising a reinforcing material and the ceramic silicone resin composition according to claim 1 attached to the reinforcing material after impregnation and drying.

12. A laminate comprising at least one prepreg according to claim 11.

13. A copper-clad laminate comprising at least one laminated prepreg according to claim 11 and a copper foil pressed on one side or both sides of the laminated prepreg.

14. A printed circuit board comprising at least one laminate according to claim 12.

\* \* \* \* \*